July 19, 1938.  W. H. STEGER  2,124,378
ARTIFICIAL BAIT
Filed July 11, 1936
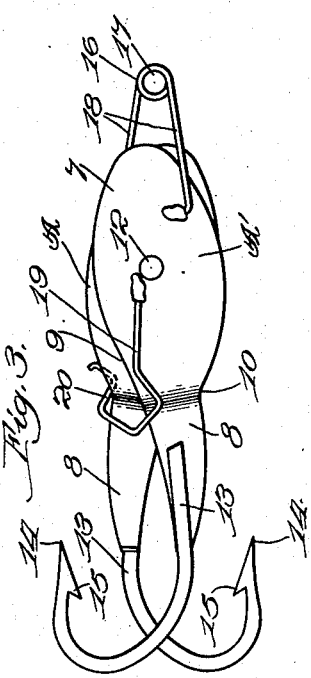
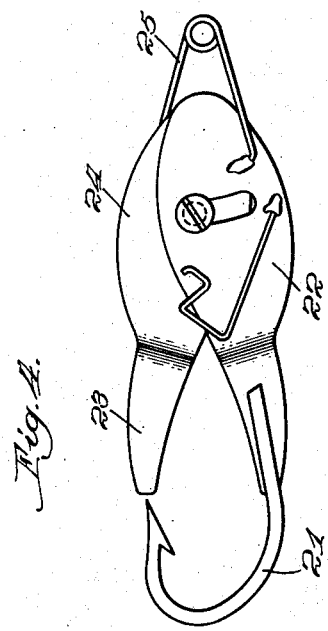
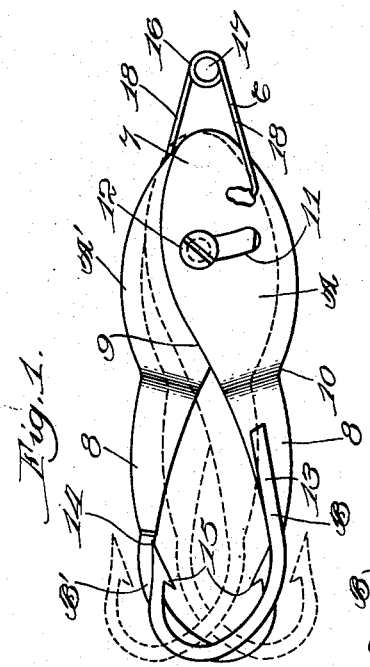
Inventor:
Werner H. Steger.
By Dyrenforth, Lee, Chritton & Wiles,
Attys.

Patented July 19, 1938

2,124,378

UNITED STATES PATENT OFFICE 2,124,378

ARTIFICIAL BAIT

Werner H. Steger, Chicago, Ill.

Application July 11, 1936, Serial No. 90,172

1 Claim. (Cl. 43—36)

This invention relates to artificial baits and the primary object is to provide an improved fish bait which is particularly adapted to casting and trolling.

A feature of the invention resides in the arrangement of a fish hook and its supporting member with relation to a companion member so that the device may be used as a weedless hook. A further feature of the invention is the provision of a bait holding device which is adapted to hold the hook or hooks in open position, if desired.

Another feature of the invention is to provide a bait which in plan view, operating as a weedless bait, assumes the appearance of a frog, while when arranged in open position with the legs in juxtaposition it assumes the appearance of a small fish.

The invention is illustrated in the preferred embodiment in the accompanying drawing, in which—

Figure 1 is a plan view of an artificial bait embodying the invention, the dotted lines indicating its open position; Fig. 2, a side elevational view the device shown in Fig. 1; Fig. 3, a bottom plan view of the same; and Fig. 4, a bottom plan view of a modification in which but one hook is employed.

In the embodiment illustrated in Figs. 1-3, the device is shown comprising an upper body member A and a lower body member A'; a pair of hooks B and B'; and a torsion spring C.

The rear portion of the body members A and A' are shaped somewhat like a frog leg and have an enlarged rounded front end portion 7 which tapers rearwardly to the foot portions 8 to which the hooks are rigidly connected. As shown in Fig. 1, the inner portion of the members may have less curvature as indicated at 9, while the outer portion may have a slight reversed curve as indicated at 10. However, the curvatures of the members may be of various designs to produce the desired action when drawn through water. The lower leg portions 8, as best shown in Fig. 2, may be angularly disposed with respect to the front portions 7, a satisfactory and preferred arrangement being illustrated. The body members are connected for limited movement by means of a pin and slot connection wherein the member A is provided with a slot 10 and member A' is tapped to receive a cap screw 12. This connection limits the movement of the body members inwardly and outwardly.

The hooks B and B' are standard type fish hooks having a shank portion 13, a point 14, and a barb 15. A pin and slot connection is arranged so that when the body members are in their extended position as illustrated in Fig. 1 the points 14 will be shielded from weeds and the like by the ends of the lower legs 8. However, when a fish bites the bait, the body members will be collapsed into juxtaposition throwing both of the hooks outwardly to engage the fish.

The spring C is shown in the form of a torsion coil 16, somewhat like a safety pin spring, and provides a ring 17 to which the fish line may be attached. The spring is provided with rearwardly extending arms 18 which are connected to the body members A and A' so as to urge the rear end of the legs to extended position as illustrated in Fig. 1. As best seen in Figs. 2 and 3 the lower side of the bait is provided with a resilient wire fastening 19 which may be used to hold a pork rind or similar auxiliary bait against the body member A'. The same member has a curved end 20 which is adapted to snap over the edge of the member A and hold the hooks in unshielded position for open water fishing.

The parts may be suitably plated or enameled in colors to attract the attention of the fish. It may be noted that when the device is extended as is shown in Fig. 1, the bait assumes the appearance of a frog swimming through the water, while in the collapsed position shown in Fig. 3, the device resembles a minnow, with the cap screw 12 giving the appearance of an eye.

In the modification shown in Fig. 4, the device is similar in all respects to that shown in Figs. 1, 2, and 3 except that but one hook 21 is carried by the body member 22 and the rear portion 23 of the body member 24 serves as a weed guard for the point of the hook. The body members 22 and 24 are connected in the manner shown in the preferred form but it will be understood that the body members may be pivotally connected at the front portion by a suitable pivot and a spring 25 arranged on the body member to give the proper action.

The foregoing detailed description has been given for clearness of understanding only, and no unnecessary limitations should be understood therefrom, but the appended claim should be construed as broadly as permissible, in view of the prior art.

I claim:

An artificial bait, which in plan view has the appearance of a frog, comprising: a pair of similar members having broadened front end portions resiliently connected by means of a spring adapted to urge the narrow rear ends of said members to extended position, a hook mounted on each of said members and normally extending towards the companion member so that each of said members completes an open faced loop with the hook on the other member and forms a yielding weed-guard for said hook, a pin-and-slot connection between the broadened front end portions of the members to limit the outward movement of the hooks from guarded position, and a resilient wire clip fastened to the forward portion of one of the members so as to be adapted to hold an auxiliary bait and grip the other of said members in juxtaposition with the hooks unguarded.

WERNER H. STEGER.